US008510465B2

(12) United States Patent
Muoio et al.

(10) Patent No.: US 8,510,465 B2
(45) Date of Patent: Aug. 13, 2013

(54) METHOD AND SYSTEM FOR DISTRIBUTING ART

(75) Inventors: David Muoio, Issaquah, WA (US); James P. Cook, Seattle, WA (US); Richard Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1243 days.

(21) Appl. No.: 11/710,461

(22) Filed: Feb. 22, 2007

(65) Prior Publication Data

US 2007/0180476 A1   Aug. 2, 2007

Related U.S. Application Data

(60) Continuation of application No. 10/691,723, filed on Oct. 22, 2003, now Pat. No. 7,196,678, which is a division of application No. 09/322,207, filed on May 28, 1999, now Pat. No. 6,670,934.

(60) Provisional application No. 60/118,668, filed on Feb. 3, 1999.

(51) Int. Cl.
*G06F 15/173* (2006.01)
(52) U.S. Cl.
USPC .......................... 709/238; 709/203; 709/217
(58) Field of Classification Search
USPC .................... 709/203, 212, 217, 238
See application file for complete search history.

(56) References Cited

U.S. PATENT DOCUMENTS

| 4,072,825 | A | 2/1978 | McLay et al. ........... 379/33 |
| 4,742,345 | A | 5/1988 | Di Santo et al. |
| 5,165,465 | A | 11/1992 | Kenet ................ 165/11.1 |
| 5,295,062 | A | 3/1994 | Fukushima |
| 5,310,349 | A | 5/1994 | Daniels et al. ........... 434/350 |
| 5,315,703 | A | 5/1994 | Matheny et al. |
| 5,390,138 | A | 2/1995 | Milne et al. |
| 5,390,328 | A | 2/1995 | Frey et al. |

(Continued)

FOREIGN PATENT DOCUMENTS

| EP | 0735469 A2 | 10/1996 |
| EP | 0816968 A2 | 1/1998 |

(Continued)

OTHER PUBLICATIONS

An et al., "A Multimedia Distance Learning Trail Using ISDN BRI," *AT&T Technical Journal*, Jan./Feb. 1993, 15-21.

(Continued)

*Primary Examiner* — Phuoc Nguyen
(74) *Attorney, Agent, or Firm* — Woodcock Washburn, LLP

(57) ABSTRACT

An art distribution system for distributing art to multiple display devices within an environment. The art distribution system provides a technique for specifying images to be displayed in an environment. The art distribution system provides a hierarchical representation of spaces within the environment. Each space may be further subdivided into subspaces. The art distribution system allows a user to select a space within the hierarchy and then to select an image that is to be displayed at the display devices within the selected space. The art distribution system then displays the selected image within the space including within all subspaces of the selected space. The art distribution system may allow a subsequent assignment of the image to a subspace to override within that subspace the previous selection of an image for the space.

19 Claims, 18 Drawing Sheets

(56) References Cited

U.S. PATENT DOCUMENTS

| | | | |
|---|---|---|---|
| 5,522,077 A | 5/1996 | Cuthbert et al. | |
| 5,524,272 A | 6/1996 | Podowski et al. | 725/74 |
| 5,537,541 A | 7/1996 | Wibecan | |
| 5,550,816 A | 8/1996 | Hardwick et al. | |
| 5,601,436 A | 2/1997 | Sudman et al. | 434/307 R |
| 5,611,059 A | 3/1997 | Benton et al. | |
| 5,621,662 A | 4/1997 | Humphries et al. | |
| 5,675,390 A | 10/1997 | Schindler et al. | |
| 5,696,486 A | 12/1997 | Poliquin et al. | |
| 5,708,834 A | 1/1998 | Sasaki et al. | |
| 5,724,588 A | 3/1998 | Hill et al. | |
| 5,731,844 A | 3/1998 | Rauch et al. | |
| 5,742,517 A | 4/1998 | Van Den Bosch | |
| 5,796,945 A * | 8/1998 | Tarabella | 709/219 |
| 5,799,041 A | 8/1998 | Szkopek et al. | |
| 5,805,118 A | 9/1998 | Mishra et al. | 345/1.1 |
| 5,805,763 A | 9/1998 | Lawler et al. | |
| 5,859,885 A | 1/1999 | Rusnica et al. | |
| 5,864,387 A | 1/1999 | Reed et al. | |
| 5,867,223 A | 2/1999 | Schindler et al. | |
| 5,883,621 A | 3/1999 | Iwamura | |
| 5,896,138 A | 4/1999 | Riley | |
| 5,945,993 A | 8/1999 | Fleischmann | |
| 5,970,468 A | 10/1999 | Bull | |
| 5,990,886 A | 11/1999 | Serdy et al. | 715/752 |
| 6,018,619 A | 1/2000 | Allard et al. | |
| 6,021,438 A | 2/2000 | Duvvoori et al. | |
| 6,098,116 A | 8/2000 | Nixon et al. | |
| 6,105,055 A | 8/2000 | Pizano et al. | 709/204 |
| 6,108,661 A | 8/2000 | Caron et al. | |
| 6,111,586 A | 8/2000 | Ikeda et al. | |
| 6,118,450 A | 9/2000 | Proehl et al. | 715/810 |
| 6,122,627 A | 9/2000 | Carey et al. | |
| 6,125,363 A | 9/2000 | Buzzeo et al. | |
| 6,141,010 A | 10/2000 | Hoyle | |
| 6,167,469 A | 12/2000 | Safai et al. | |
| 6,177,931 B1 | 1/2001 | Alexander et al. | |
| 6,178,457 B1 | 1/2001 | Pitchford et al. | |
| 6,195,591 B1 | 2/2001 | Nixon et al. | |
| 6,199,195 B1 | 3/2001 | Goodwin et al. | |
| 6,205,126 B1 | 3/2001 | Moon | |
| 6,219,046 B1 | 4/2001 | Thomas et al. | |
| 6,226,690 B1 | 5/2001 | Banda et al. | |
| 6,269,362 B1 | 7/2001 | Broder et al. | |
| 6,301,557 B1 | 10/2001 | Miller et al. | |
| 6,331,865 B1 | 12/2001 | Sachs et al. | 715/776 |
| 6,336,101 B1 | 1/2002 | Dean et al. | |
| 6,363,393 B1 | 3/2002 | Ribitzky | |
| 6,442,573 B1 | 8/2002 | Schiller et al. | |
| 6,466,234 B1 | 10/2002 | Pyle et al. | |
| 6,466,663 B1 | 10/2002 | Ravenscroft et al. | |
| 6,473,791 B1 | 10/2002 | Al-Ghosein et al. | |
| 6,670,934 B1 | 12/2003 | Muoio et al. | |
| 6,684,246 B1 | 1/2004 | Hasha | |
| 6,704,924 B1 | 3/2004 | Hasha | |
| 6,721,898 B1 | 4/2004 | Hasha | |
| 6,734,879 B2 | 5/2004 | Hasha et al. | |
| 6,784,925 B1 | 8/2004 | Tomat et al. | |
| 6,850,978 B2 | 2/2005 | Springmeyer et al. | |
| 6,886,155 B2 | 4/2005 | Hasha | |
| 6,970,925 B1 | 11/2005 | Springmeyer et al. | |
| 6,975,308 B1 | 12/2005 | Bitetto et al. | |
| 6,993,771 B1 | 1/2006 | Hasha et al. | |
| 7,010,749 B2 | 3/2006 | Hasha et al. | |
| 7,039,943 B1 | 5/2006 | Hasha | |
| 7,155,679 B2 | 12/2006 | Bandaru et al. | |
| 7,159,147 B2 | 1/2007 | Hasha | |
| 7,196,678 B2 | 3/2007 | Muoio et al. | |
| 7,270,219 B2 * | 9/2007 | Amo et al. | 187/391 |
| 7,287,074 B2 | 10/2007 | Springmeyer et al. | |
| 7,383,533 B2 | 6/2008 | Hasha | |
| 7,529,978 B2 | 5/2009 | Hasha | |
| 7,617,453 B1 | 11/2009 | Hasha et al. | |
| 7,620,957 B2 | 11/2009 | Hasha et al. | |
| 2002/0026349 A1 * | 2/2002 | Reilly et al. | 705/14 |
| 2002/0180697 A1 * | 12/2002 | Freiberger et al. | 345/156 |
| 2003/0063601 A1 | 4/2003 | Niida et al. | |
| 2003/0185545 A1 | 10/2003 | Young et al. | |
| 2005/0088333 A1 * | 4/2005 | Allport | 341/176 |
| 2005/0204389 A1 | 9/2005 | Proehl et al. | |
| 2005/0278747 A1 | 12/2005 | Barton et al. | |
| 2006/0114727 A1 | 6/2006 | Hasha | |
| 2006/0218479 A1 * | 9/2006 | Torres | 715/500 |

FOREIGN PATENT DOCUMENTS

| | | |
|---|---|---|
| EP | 0854607 A1 | 7/1998 |
| EP | 0 889 636 A2 | 1/1999 |
| EP | 0 889 636 A3 | 10/1999 |
| WO | WO 94/11810 A1 | 5/1994 |
| WO | WO 95/31872 | 11/1995 |
| WO | WO 96/00946 | 1/1996 |
| WO | WO 97/31451 A1 | 8/1997 |
| WO | WO 98/49618 A1 | 11/1998 |
| WO | WO 98/50838 | 11/1998 |
| WO | WO 99/04342 | 1/1999 |
| WO | WO 92/05657 | 4/1999 |
| WO | WO 99/54663 | 10/1999 |
| WO | WO 00/29960 | 5/2000 |

OTHER PUBLICATIONS

Bisdikian et al., "MultiMedia Digital Conferencing: A Web-Enabled Multimedia Teleconferencing System," *IBM*, Mar. 1998, 421(2), 281-298.

Davoli et al., "A Testbed for the Evaluation of an Interactive Multimedia Distance Learning Service," *IEEE*, Jun. 18, 1995, 1488-1493.

Maly et al., "A New Paradigm for Distance Learning: Interactive Remote Instruction," *Old Dominion University*, Aug. 28, 1994, 682-689.

Santini et al., "The Virtual Museum: an Integrated Text and Image Database," *IEEE Second Workshop*, Dec. 7-9, 1998, 253-258.

Schmidt et al., "Configuring Function-based Communication Protocols for Multimedia Applications," *University of California, Irvine*, Jun. 1996, 1-14.

"Nifty Ways you Can Soup Up Your Machine," Heather Newman Free Press Staff, downloaded 2009.

Gates III, W.H., "The Road Ahead," Viking, New York, New York, U.S.A., 1995, p. 216-227.

Lunn, J., "Virtual Reality," Sunday Herald Sun, Melbourne, Victoria, Australia, Jan. 1, 1998, p. 14.

DeWire, D.T., "Thin Clients: Delivering Information Over the Web," Michael Sprague ed., McGraw-Hill, New York, New York, U.S.A., 1998, Chaps. 15-16, pp. 235-264.

Templin, N., "Choice Hotels International Bets Guests Will Go for Wired PCs," The Wall Street Journal, New York, New York, U.S.A., Jul. 26, 1999.

Kenna, K., "$81 million home built for a king—of cyberspace," Toronto Star, 1997, 3 pages.

Erickson, J., "The House That Microsoft Built Billionaire Bill's Estate Will be an Electronic Showcase for Art," The Seattle P-I, May 10, 1991, p. D1, (printout) pp. 1-3.

Corr, C., "Gates Buys Electronic Rights to Artworks—Seattle Art Museum Images Will be Shown at His $5 Million Home," Seattle Times Company, 1991, pp. 1-3.

Nielsen, S., "Technology Doesn't Make Room for Random Moonings," Bell & Howell Information and Learning Company, 1998, pp. 1-2.

Schmiederer, E., "All Power Proceeds from the Picture," Ars Electronica Linz GmbH, Dec. 5, 2008, pp. 1-6.

Wallace, J., "The House Big Money Will Buy If You Were the Richest Person in the World What Kind of Home Would You Build? Here's What Bill Gates Did." Seattle P-I, 1997, p. D1, (printout) 3 pages.

"Customizing the Lan Netview Fix Action Table", IBM Technical Disclosure Bulletin, US, IBM Corp., Apr. 1994, 37(4B), 3 pages.

Ansell et al., "An architecture for the design of TMN applications", International Conference on Communications, Geneva, Switzerland, May 23-26, 1993, 1635-1639.

Attiya et al., "Sequential Consistency Versus Linearizability", ACM Transactions on Computer Systems, US, Association for Computing Machinery, New York, May 1994, 12(2), 91-122.

Auer et al., "Das informationsmodell: ein konzept fur das management offener kommunikationssysteme", Frequenz, 1993, 47(1-2).

Breslau et al., "Dynamic Object Temporary Stop/Disappearance Notification/Permission", IBM Technical Disclosure Bulletin, Dec. 1995, 38(12), 2 pages.

Bushby, "Bacnet: A Standard Communication Infrastructure for Intelligent Buildings", Published in Automation in Construction, 1997, 6(5-6), 529-540.

Courtney, "Phantom : An Interpreted Language for Distributed Programming", Department of Computer Science, 1995, 19 pages.

Friesen et al., "Dave: A Plug-and-Play Model for Distributed Multimedia Application Development", IEEE, Parallel & Distributed Technology: Systems & Applications, 3(2), 1995, 22-28.

Garcia-Molina et al., "Ordered and Reliable Multicast Communication", ACM Transactions on Computer Systems (TOCS), US, Association for Computing Machinery, New York, Aug. 1991, 9(3), 242-271.

International Business Machine Corporation, "SOMobjects Developer Toolkit. Users Guide. An Introductory Guide to the System Object Model and Its Accompanying Frameworks Version 2.1", Oct. 1994, 24 pages.

Object Management Group, "The Common Object Request Broker: Architecture and Specification. Revision 2.0", Corba Specification, Jul. 1995.

Patterson et al., "Notification Servers for Synchronous Groupware", Proceedings of the 1996 ACM conference on Computer supported cooperative work, 1996, 122-129.

Schapeler et al., "Model based maintenance for MANs", 1225 Electrical Communication, 1993, 268-277.

Shklar et al, "MetaMagic: Generating Virtual Web Sites through Data Modeling", Apr. 7-11, 1997, 1-14.

Sony et al., "The HAVI specification: Specification of the Home Audio/Video Interoperability (HAVI) Architecture: version 1.0 beta", HAVI Organization, San Ramon, CA, US, May 15, 2001, 1-499.

Stevenson et al., "Client-Server in Multi-Server Operating Systems: The Mach-US Approach", Sep. 1994, 18 pages.

Swank et al., "Web Database: Developers Guide with Visual Basic 5", Sams.net, Apr. 1997, 5 pages.

Wegner, "Frameworks for Compound Active Documents (Draft)", Oct. 20, 1997, 1-15.

* cited by examiner

METHOD AND SYSTEM FOR DISTRIBUTING ART

CROSS-REFERENCE TO RELATED CASES

This application is a continuation of U.S. patent application Ser. No. 10/691,723 filed Oct. 22, 2003, which is a divisional of U.S. patent application Ser. No. 09/322,207 filed May 28, 1999, which claims the benefit of U.S. provisional application Ser. No. 60/118,668 filed Feb. 3, 1999. The contents of each of the above-referenced U.S. patent applications are herein incorporated by reference in their entireties.

This application is also related to U.S. patent application Ser. No. 09/322,455, entitled "METHOD AND SYSTEM FOR TRACKING SOFTWARE COMPONENTS," filed on May 28, 1999; U.S. patent application Ser. No. 09/322,962, entitled "METHOD AND SYSTEM FOR TRACKING CLIENTS," filed on May 28, 1999; U.S. patent application Ser. No. 09/322,643, entitled "AUDIO VISUAL ARCHITECTURE," filed on May 28, 1999; U.S. patent application Ser. No. 09/322,459, entitled "METHOD AND SYSTEM FOR CONTROLLING ENVIRONMENTAL CONDITIONS," filed on May 28, 1999; U.S. patent application Ser. No. 09/322,965, entitled "METHOD AND SYSTEM FOR IMPLEMENTING VIRTUAL FUNCTIONS OF AN INTERFACE," filed on May 28, 1999; U.S. patent application Ser. No. 09/322,964, entitled "METHOD AND SYSTEM FOR GENERATING A USER INTERFACE FOR DISTRIBUTED DEVICES," filed May 28, 1999; U.S. patent application Ser. No. 09/322,852, entitled "METHOD AND SYSTEM FOR MANAGING SOFTWARE COMPONENTS," filed on May 28, 1999; and U.S. patent application Ser. No. 09/322,457, entitled "METHOD AND SYSTEM FOR PROPERTY NOTIFICATION," filed on May 28, 1999, the disclosures of which are incorporated herein by reference.

FIELD OF THE INVENTION

The described technology relates generally to a computer system for displaying art and, more particularly, to a system that displays electronic images in a distributed environment.

BACKGROUND

Prior to the electronic imaging of art, each artwork could only be displayed at one location. If a copy of the artwork was made, then those copies could be displayed at additional locations. With the advent of electronic imaging of art, electronic images could be displayed at multiple locations using multiple computer displays, in addition, the artwork that is displayed at a computer display can be changed automatically at periodic intervals for one artwork to the next. A play list of images can be defined. The computer system that processes the play list displays each image in sequence at periodic intervals. In environments such as museums, a central computer system may control the displaying of a play list at various display devices throughout the museum. The central computer system may maintain a database of the images, and the museum administrator can define play lists and can specify on which display devices are the images of the play lists to be displayed. Such techniques for displaying art may be acceptable for museums, but may be unacceptable in other environments. The techniques may be acceptable in a museum because only the administrator from a central location defines the play lists and specifies the display devices at which the play lists are to be displayed and because each image that can possibly be displayed needs to be stored at the central computer system before it is assigned to a play list.

In other environments, such as a large house or an office building, it may be desirable to allow users to control the display of images from input devices throughout the environment. In addition, it would be desirable if the images that can be assigned to a play list were not limited to those currently stored at the computer system. Finally, it would be desirable if an image is automatically made available for inclusion in play lists when the computer system detects that the image satisfies user-specified criteria and that the bitmap for the image is now accessible and can be downloaded to the computer system.

SUMMARY

An art distribution system for distributing art to multiple display devices within an environment is provided. The art distribution system provides a technique for specifying images to be displayed in an environment. The art distribution system provides a hierarchical representation of spaces within the environment. Each space may be further subdivided into subspaces. The art distribution system allows a user to select a space within the hierarchy and then to select an image that is to be displayed at the display devices within the selected space. The art distribution system then displays the selected image within the space including within all subspaces of the selected space. The art distribution system may allow a subsequent assignment of the image to a subspace to override within that subspace the previous selection of an image for the space. The image to be displayed may be part of a play list of images.

The art distribution system also provides for the downloading of images in a background mode from a remote image storage device. The art distribution system provides an image administration module that allows a user to identify images that are to be included in a play list. The image administration module then sends the identity of those images to an art server. Upon receiving the identity of those images, the art server determines whether the bitmaps for those images have already been stored at the art server. If a bitmap for an image has not already been stored, then the art distribution system requests that the image be downloaded from an image storage device to the art server.

The art distribution system also allows a user to specify that image information for accessible images that match specified criteria should be downloaded when those images become accessible. The art distribution system periodically transmits the criteria to image storage devices. The image storage devices identify those images that satisfy the criteria and then provides those identifications to the art distribution system. The art distribution system stores information describing those images so that a user can subsequently select those images to be included in a play list. The bitmap for an image can then be retrieved after the image is assigned to a play list.

The art distribution system also allows for a user to specify the play list that is to be displayed on a display device from a user control point device that may be located in the same room as the display device. The art distribution system provides a user interface at a user control point device to which a user can specify the play list for a certain space. In this way, the users can control the play list assignments from distributed locations.

DETAILED DESCRIPTION OF ILLUSTRATIVE EMBODIMENTS

Figure 1:
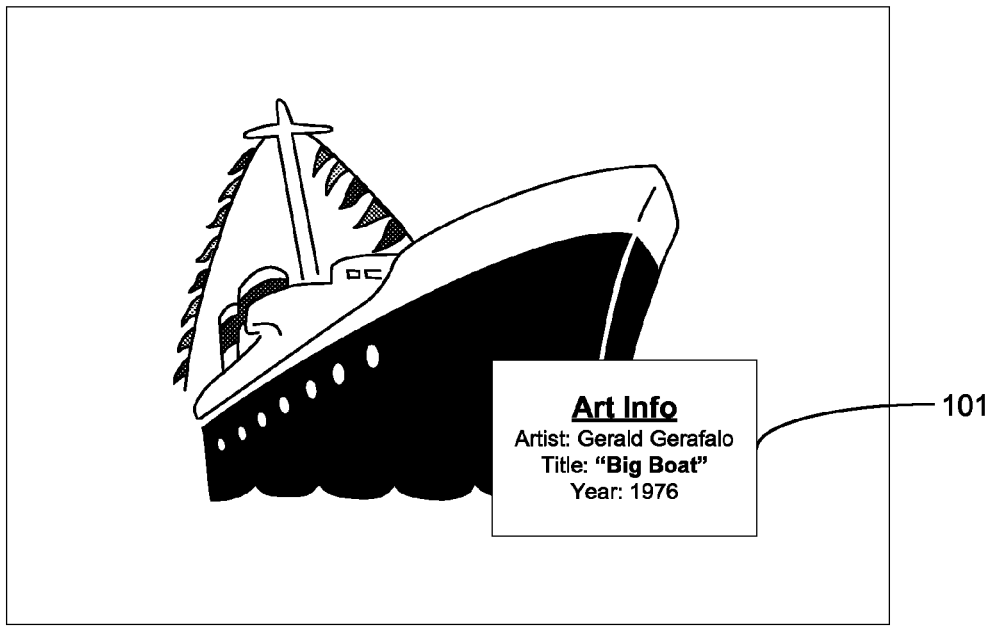
FIG. 1 illustrates a displaying of an image along with image information.

A method and system for distributing images throughout an environment is provided. The art distribution system allows a user to specify play lists of images and to specify display devices at which the images of the play lists are to be displayed. The art distribution system maintains a database of the images that are specified in the play lists. The environment in which the art distribution system displays images is hierarchically organized into spaces and subspaces. For example, if the environment is a large house, then the spaces may be the east wing and west wing of the house, the subspaces of the east wing may be the bedrooms and the kitchen, and the subspaces of the bedrooms may be the master bedroom, the guest bedroom, and so on. Each space within the hierarchy may have one or more display devices within it. For example, the master bedroom may have several display devices that are capable of displaying art images. The art distribution system allows a user to specify that a play list is to be displayed at any level in the hierarchy. For example, a user may specify that a certain play list is to be displayed throughout the east wing of the house, and the art distribution system will display that play list at every display device within the east wing. If a user then specifies that a subspace of the east wing, such as the master bedroom, is to display another play list, then the art distribution system will display that other play list at all display devices within the master bedroom. The art distribution system will, however, continue to display the original display list within the other spaces of the east wing. The art distribution system may also include a non-override mode in which the specifying of a play list for a space will not override a play list that has the specifically specified for a subspace. For example, if a new play list is specified for the east wing, that play list will be display throughout the east wing except within the master bedroom because the master bedroom was specifically assigned a master play list.

The art distribution system allows a user from within any space to control the play list that is currently being displayed within that space. Each space may have a user control point devices, such as a touch panel display, within it. A user can specify a play list to be displayed within the space using the user control point device. Thus, the art distribution system can be controlled from distributed locations rather than from only a central location. The display devices may also display image information in response to a user request. For example, if the display device is a touch panel display, then when a user touches the panel, the art distribution system displays information relating to the image currently being displayed. The information may include the name of the artist, the country of the artist, and the year in which the art was generated.

The art distribution system may also allow for images to be retrieved in a background mode and allow information on images to be retrieved as the images become accessible. The art distribution system provides a user interface through which a user can define, delete, and modify play lists. The art distribution system may display the names of the images, information relating to the image, and possibly even a thumbnail representation of the images to assist the user in defining a play list. If the art distribution system does not already have an electronic copy (e.g., a bitmap) of the full-sized image, then the art distribution system queues a request to download the image. A download module of the art distribution system is responsible for retrieving a copy of the image in a background mode and storing it in the image database of the art distribution system. In addition, a user can define criteria for images of interest. For example, the user may specify an interest in images of a certain artist. As new images of that artists become accessible, the art distribution system automatically retrieves information relating to those new images. In this way, a user can be made aware of certain classes of images as they become electronically accessible to the art distribution system. The art distribution system can retrieve information.

Figure 2:
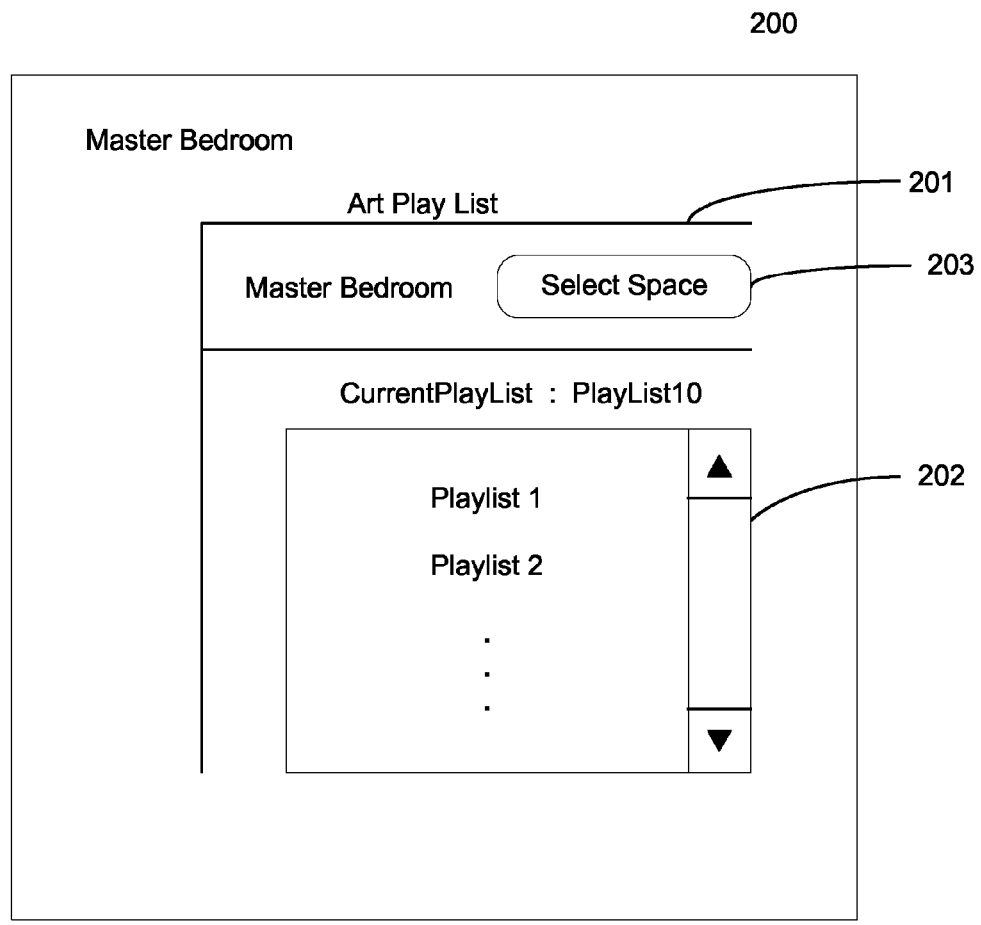
FIG. 2 illustrates the display of a user control point device for specifying a play list for a certain space.

FIGS. 1-5 illustrate portions of the user interface of the art distribution system in one embodiment. FIG. 1 illustrates a displaying of an image along with image information. The display device 100 displays the images of a play list under control of the art distribution system. The display device is currently displaying an image of a sail boat. When a user performs a specified action (e.g., touches a touch screen display or click a mouse button), the art distribution system displays a pop-up window 101 that contains information relating to the image currently being displayed. The information may include the name of the artist, the year in which the artist created the work, and so on. That pop-up window may be displayed for a predefined time interval or until user performs another action. FIG. 2 illustrates the display of a user control point device for specifying a play list for a certain space. The user control point device 200 is currently displaying an art play list panel 201. The art play list panel indicates that the current play list for the master bedroom is play list 10. The art play list panel also includes a scroll box 202 that contains a list of play lists that can be specified for the master bedroom. The user selects the desired play list from the scroll box. The art play list panel also contains a select space button 203. The art distribution system may allow the user to control the play list for other spaces from the current space (i.e., the master bedroom). When the user selects the select space button, the art distribution system displays a list of the spaces that can be controlled from the current space. When the user selects one of those spaces, then the art distribution system displays a panel similar to that shown in FIG. 2 for that other space.

Figure 3:
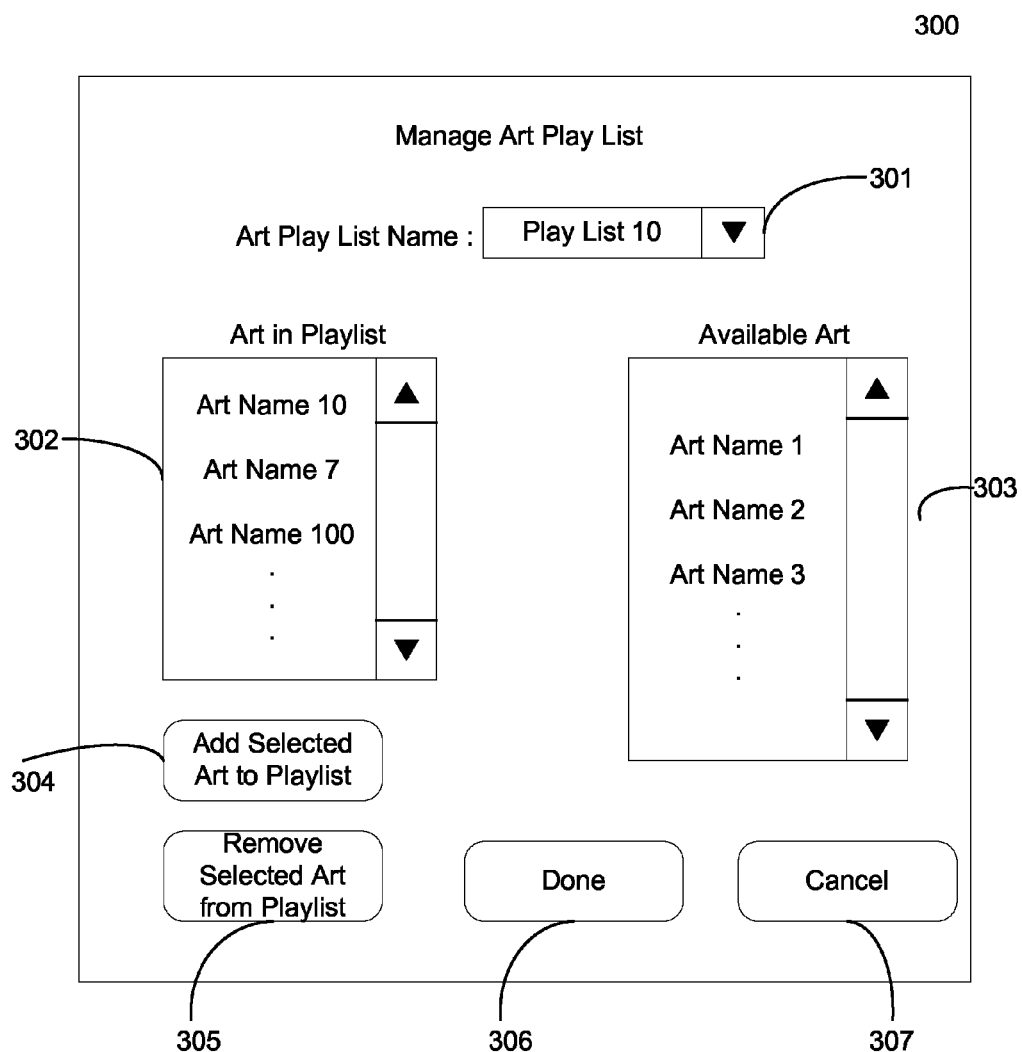
FIG. 3 illustrates a user interface for managing the play lists.

FIG. 3 illustrates a user interface for managing the play lists. The art distribution system allows a user to create and modify play lists. One skilled in the art will appreciate that many different user interfaces can be used for specifying play lists. The display 300 includes an art play list name drop-down list 301, an art play list scroll box 302, and an art available scroll box 303. The display also includes an add button 304, a remove button 305, a done button 306, and a cancel button 307. A user can either create a new play list or modify an existing play list using this user interface. To create a new play list, the user enters the name of the play list in the art play list name field portion of the drop-down list. The user then selects the art to be added to the play list from the art available scroll box. The user then selects the add button to add that art to the art play list. The art play list scroll box lists the images that are currently in the selected play list. To remove art from the art play list, the user selects the art from the art play list scroll box and then selects the remove button. To modify an existing play list, the user selects the play list using the art play list name list box to select the play list. In response, the art distribution system displays the images of the play list in the art play list scroll box. The user can then add, remove, and reorder the images of the play list and delete the play list itself.

Figure 4:
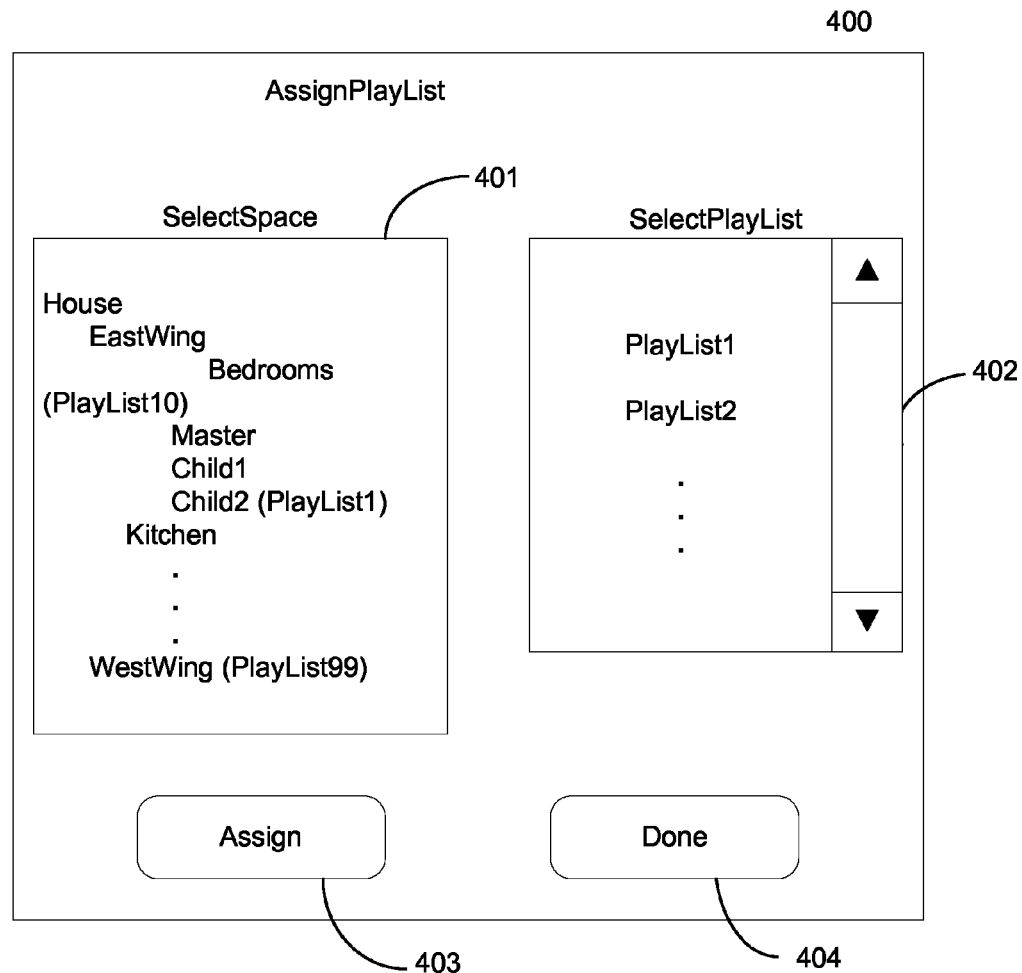
FIG. 4 illustrates a user interface for assigning a play list to a particular space.

FIG. 4 illustrates a user interface for assigning a play list to a particular space. The display 400 includes a space hierarchy window 401, a play list scroll box 402, an assignment button 403, and a done button 404. The space hierarchy window displays the space hierarchy for the environment in which the art distribution system is controlling. In this example, the environment is a house and the spaces include an east wing and west wing, the east wing includes a bedroom subspace, and so on. This hierarchy can be displayed in a manner similar to the well-known techniques for displaying a file system directory hierarchy. The art play list currently being displayed in each space is indicated in parentheses after the is name in the space. For example, the bedrooms space is currently displaying art play list 10 and the subspaces master bedroom and child1 are also displaying art play list 10 because no play list was specifically specified for those spaces. The subspace child2 is displaying play list 1. A users assigns a play list to a space by selecting a play list from the play list scroll box, by selecting a space from the space hierarchy window, and by then selecting the assign button. The art distribution system then directs each device within that space to start displaying the play list.

Figure 5:
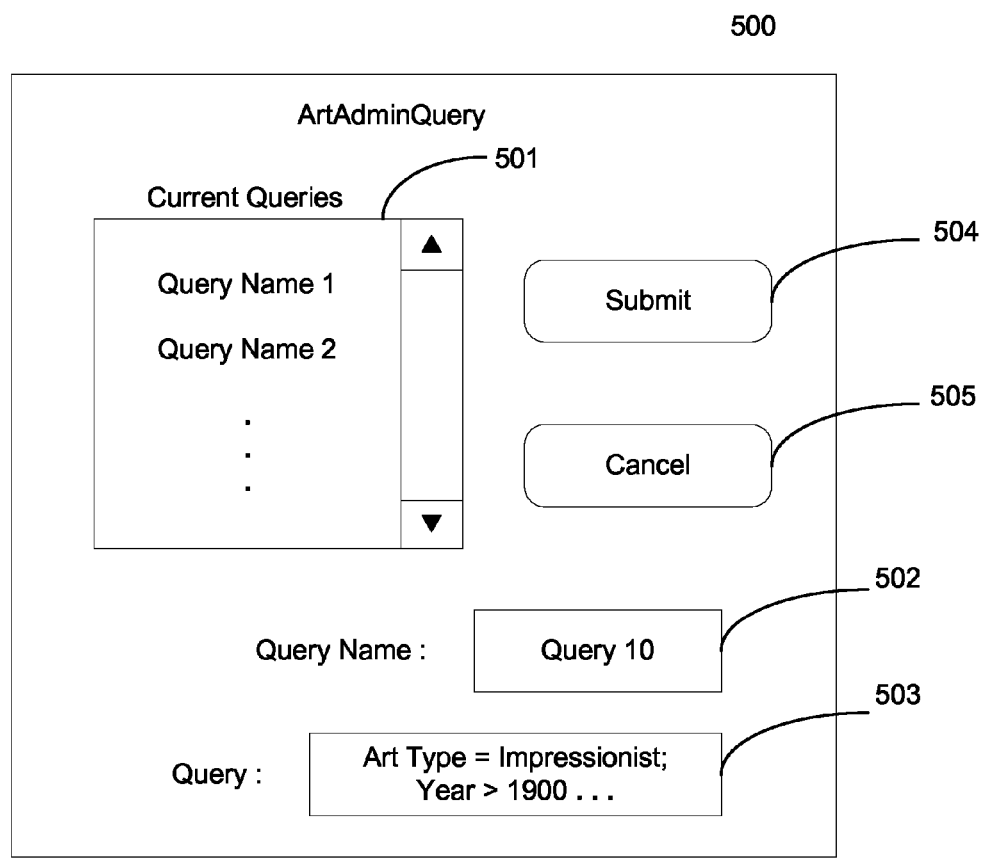
FIG. 5 illustrates a user interface for submitting a query for making images available to be put in a play list when images satisfying the query become available.

FIG. 5 illustrates a user interface for submitting a query for making images available to be put in a play list when images satisfying the query become available. In one embodiment, a query is associated with a play list, and when images that satisfy the query become accessible, they are automatically downloaded and added to the play list. The display 500 includes a current query scroll box 501, a query name field 502, and a query field 503. The display also includes a submit button 504 and a cancel button 505. To generate a new query, the user enters the name of the query in the query name field and then enters the query itself into the query field. One skilled in the art will appreciate that any well-known query specification technique can be used to define the query (e.g., SQL). To modify a query a user selects a current query from the current query scroll box. In response to the selection, the art distribution system displays the name and that query in the query name field and the query itself in the query field. When a user submits a new query or a modified query by pressing the submit button, the art distribution system starts a process of periodically checking to see if any new images are accessible to the art distribution system that satisfy that query.

Figure 6:
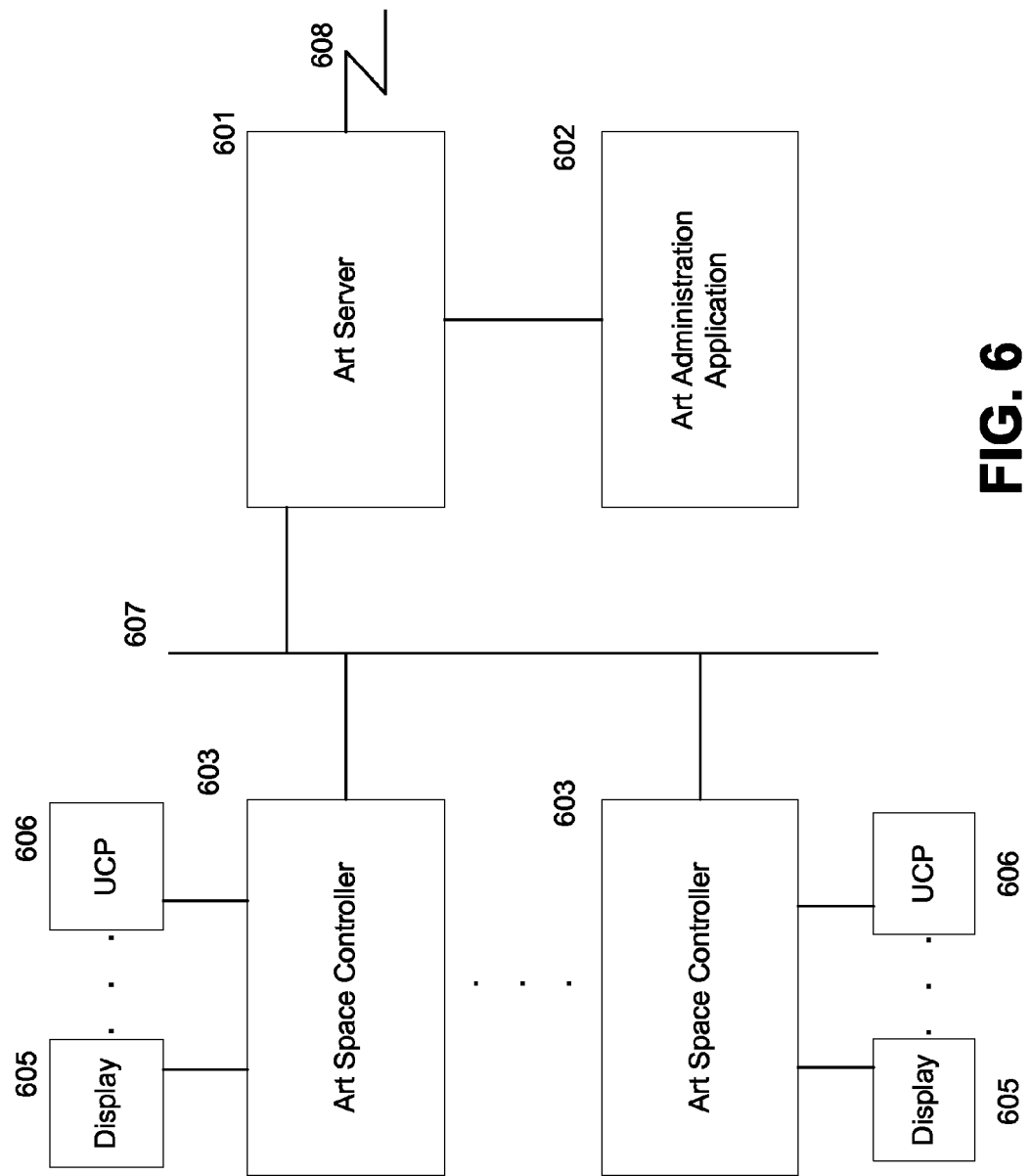
FIG. 6 is a block diagram of the components of the art distribution system in one embodiment.

FIG. 6 is a block diagram of the components of the art distribution system in one embodiment. The art distribution system may be implemented in software and may execute on a computer system with a control processing unit, memory, and input/output devices. The software and data structures may be stored in a computer-readable medium such as a memory, CD-ROM, or disk and may be transmitted over a computer-readable data transmission medium such as the Internet. The art distribution system includes an art server 601, an art administration application 602, art space controllers 603, display devices 605, and user control point devices 606. The art server is connected to the art space controllers via communications channel 607, which may be a logical channel when various components execute on the same computer system. The art server communicates via communications channel 608 (e.g., the Internet) to an art mass storage device. The art mass storage device includes images and image information for accessible images. The art server includes a database of the bitmaps for the images that are currently specified in a play list. The art administration application allows a user to define play lists and submit queries. The art space controllers are assigned play lists and control the display of the play list on the display devices and control the user interface of the user control point devices.

Figure 7:
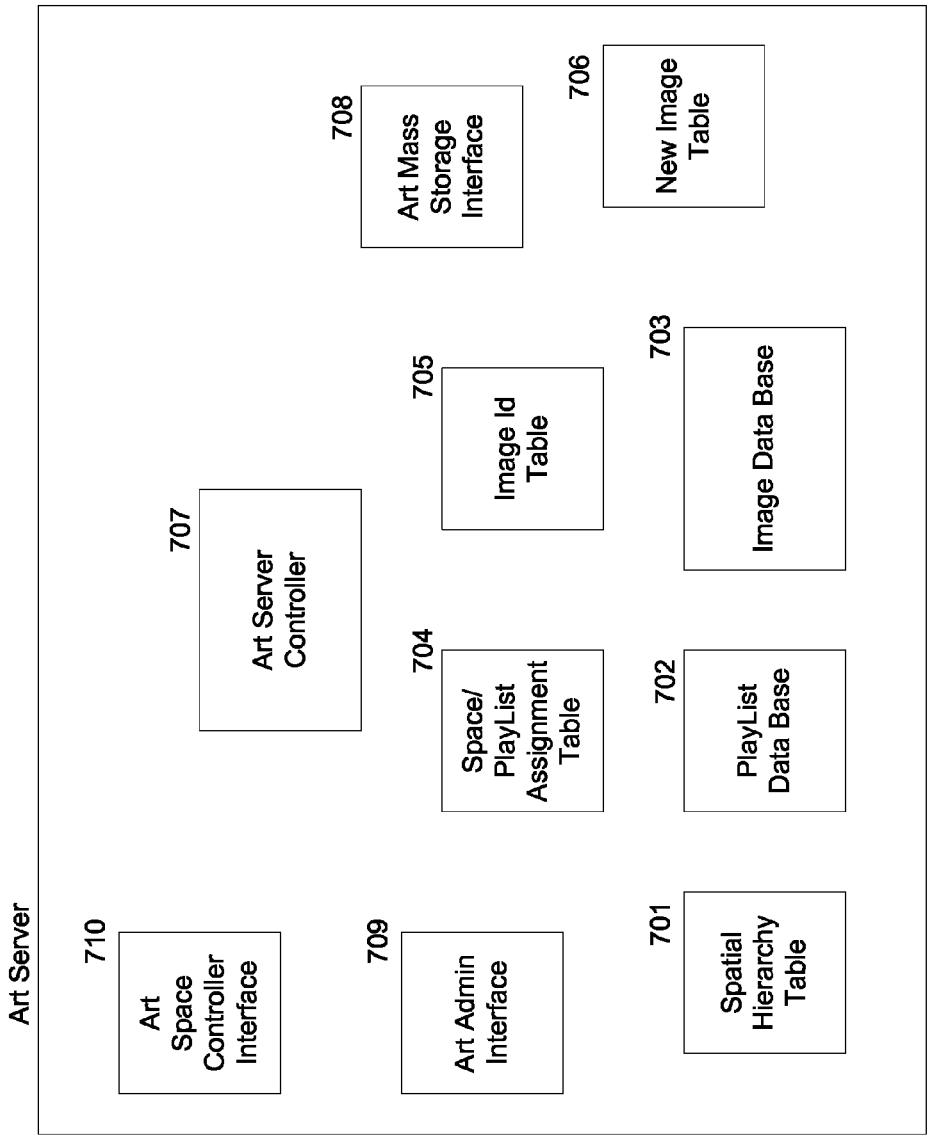
FIG. 7 is a block diagram illustrating the components of the art server in one embodiment.

FIG. 7 is a block diagram illustrating the components of the art server in one embodiment. The art server includes a spatial hierarchy table 701, a play list database 702, an image database 703, a space/play list assignment table 704, an image identifier table 705, and a new image table 706. The art server also includes an art server controller 707, an art mass storage interface 708, an art administration interface 709, and an art space controller interface 710. The spatial hierarchy table contains information describing the hierarchical organization of spaces within the environment controlled by the art server. The play list database contains the name of each play list that has been defined along with the identifiers of the images within the play list. Each play list may also have to a user-specified time associated with it that indicates the length of time each image in the play list is to be displayed. The image database contains the bitmap image of the images that have been defined in a play list. The space/play list assignment table contains the identification of each play list that is currently assigned to a space. For example, the master bedroom may be assigned play list 10. The image identifier table contains the identifier of images that are available to be included in a play list. The image identifier table may also include information describing the image including a thumbnail bitmap of the image to assist the user in determining whether that image should be included in a play list. The new image table contains a list of images that have been recently included in a play list and whose bitmaps need to be downloaded from the mass storage device. The art server controller controls the overall operation of the art server. This includes controlling the interface with the art administration application, responding to requests from the art space controllers, notifying the art space controllers of play list changes, and controlling the art mass storage interface. The art mass storage interface processes the new image table to retrieve the images that have been recently included in a play list. The art mass storage interface also periodically submits the queries to the art mass storage device to determine if any new images are accessible that satisfy the queries. The queries may be stored in a query table (not shown). The art administration interface serves as the interface between the art server and the art administration application. The art space controller interface serves as the interface between the art server and the art space controllers. When transmitting images to the art displays, the art server may spread the transmission over almost the entire time interval during which an image is displayed. For example, if an image is displayed for 60 seconds, then the art server may send $\frac{1}{60}^{th}$ of the next image every second. This allows the next image to be retrieved while the current image is displayed without overloading the communications channel with a burst of transmitted data.

Figure 8:
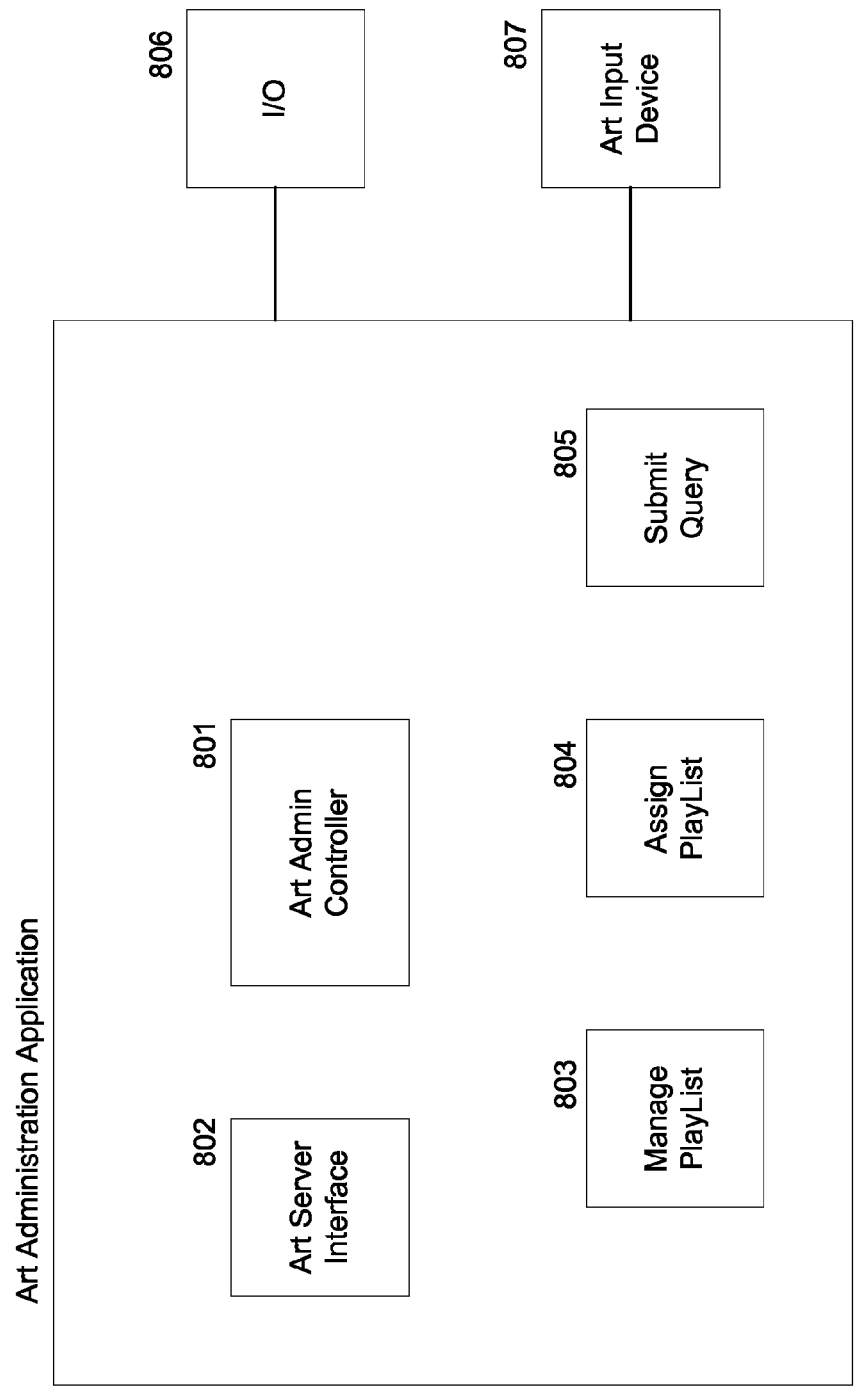
FIG. 8 is a block diagram illustrating components of an art administration application in one embodiment.

FIG. 8 is a block diagram illustrating components of the art administration application in one embodiment. The art administration application includes an art administration controller 801, an art server interface 802, a manage play list component 803, an assign play list component 804, and a submit query component 805. The art administration application interfaces with I/O devices 806, such as a keyboard and display, and interfaces with an art input device, such as an image scanner. The art administration controller controls the selection of whether the user wants to manage the play list, assign a play list to a space, or submit a query. The art server interface provides the interface from the art administration application to the art server.

Figure 9:
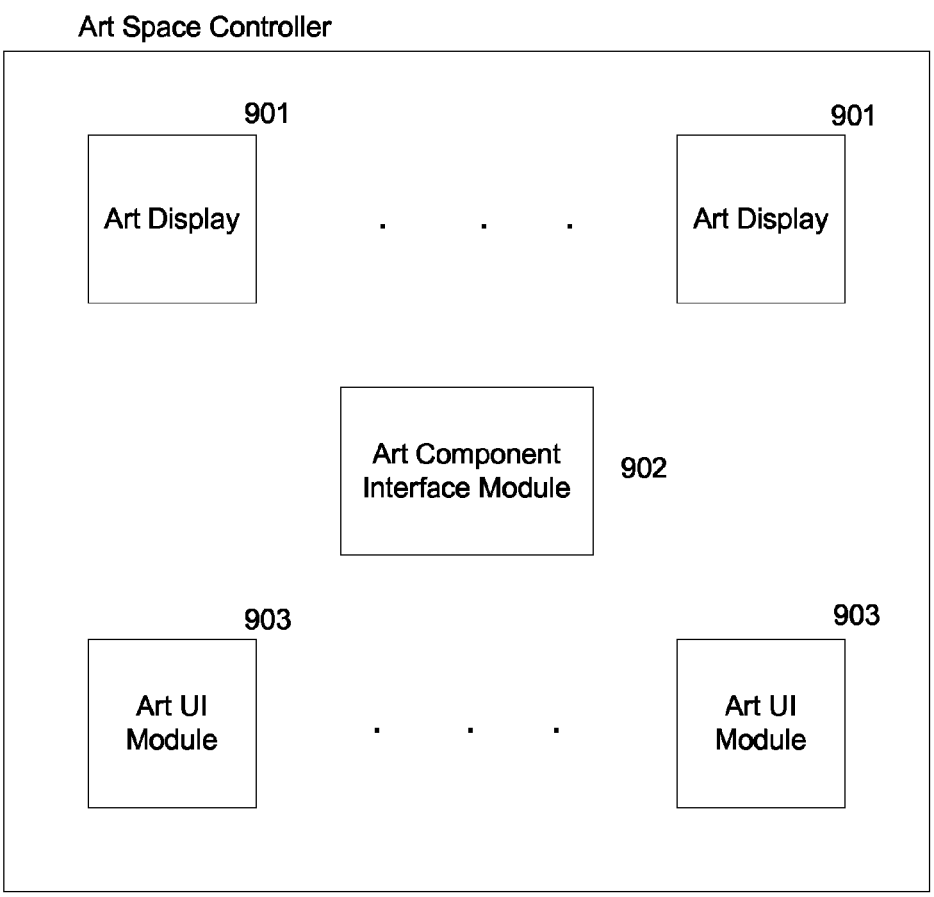
FIG. 9 is a block diagram illustrating components of an art space controller in one embodiment.

FIG. 9 is a block diagram illustrating components of an art space controller in one embodiment. The art space controller includes art display modules 901, an art component interface module 902, and art user interface modules 903. The art display modules are assigned a play list and loop through that play list retrieving the images from the art server and displaying the images on the associated display devices. The art component interface module provides the art display modules with the indication of the art display list that they are to display. The art user interface modules provide a user interface at a user control point device for selecting a play list that is to be displayed within the space.

In one embodiment, the art distribution system provides an accounting package that monitors the display of images and provides an accounting to the providers of the images. The accounting package may base the accounting for an image on how long the image has been stored at the art distribution system, the total time the image has been displayed, how many times the image has been displayed and so on. The accounting package keeps track of these statistics so that the providers can be paid accordingly. The accounting package may have a provider table that specifies how the accounting is to be performed for each provider and provides other provider-specific information, such as payment method, payment history, and so on. The image information associated with each image may include cost information and licensing restrictions related to that image. A user of the art distribution system may decide to include images in a play list based on the cost of the image. The query mechanism of the art distribution system may also take cost into consideration. For example, a query may have a maximum cost associated with it. Any image with a cost greater than that maximum cost would not satisfy the query. Alternatively, if an image would otherwise satisfy the query, the query mechanism may notify the user that an image that satisfies the query is accessible, but that its cost is more than the maximum cost. Upon receiving the notification, the user can then specify whether the image should be downloaded. To minimize the cost of images and reduce the storage space that is required, the art distribution system may automatically delete images when they are no longer included in a play list. Alternatively, the art distribution system may delay the automatic deletion for a certain period of time to allow the adding of the image to another play list without having to re-download the image.

Figure 10:
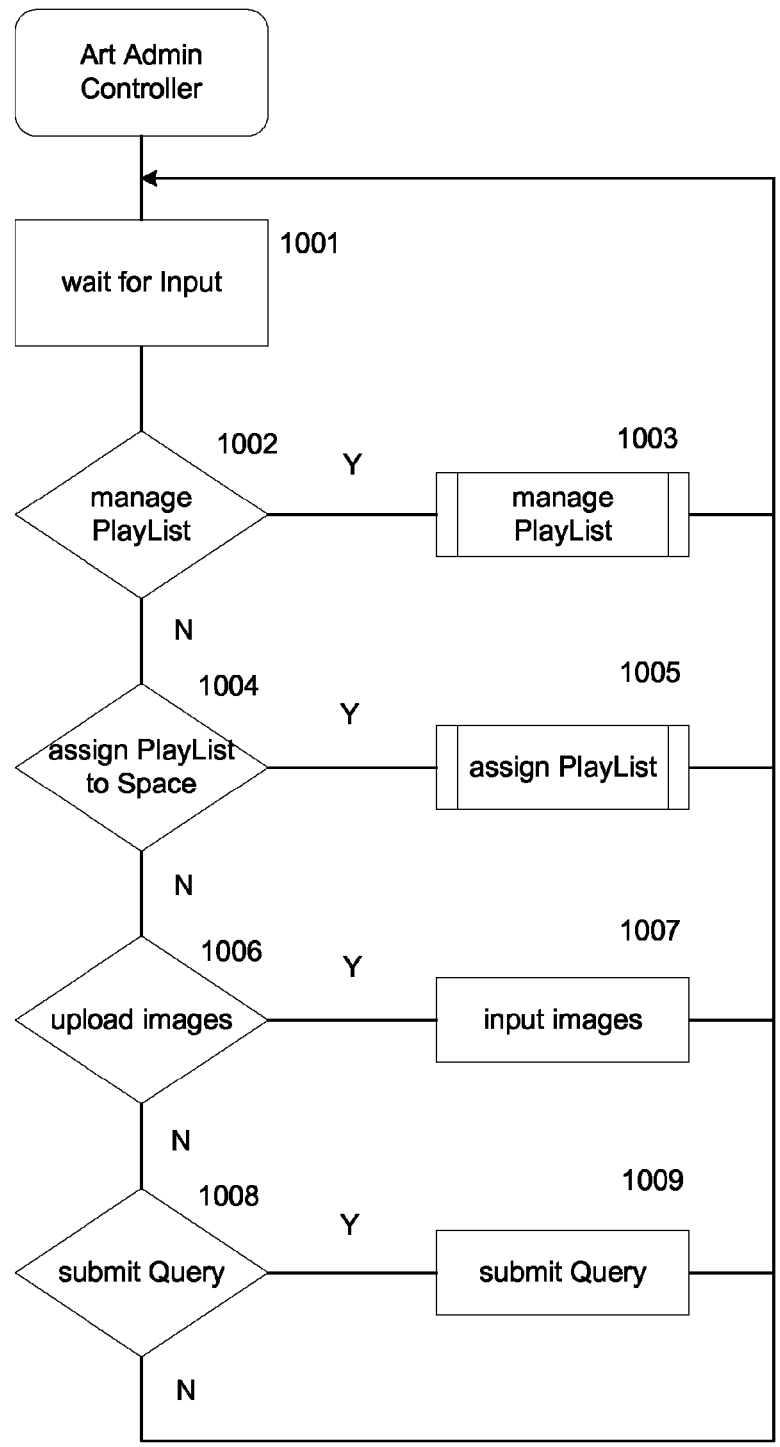
FIG. 10 is a flow diagram of the art administration controller.

FIGS. 10-18 are flow diagrams illustrating example processing of components of the art distribution system in one embodiment. FIG. 10 is a flow diagram of the art administration controller. The art administration controller allows the user to select which action to perform relating to the administration of the play lists. In step in 1001, the controller waits for input from the user. In step 1002, if the user selected to manage a play list, then the controller continues at step 1003, else the controller continues at step 1004. In step 1003, the controller invokes a function to control the managing of the play list. In step 1004, if the user selected to assign to play list to a space, then the controller continues at step 1005, else the controller continues at step 1006. In step 1005, the controller invokes the function to assign a play list to a space. In step 1006, if the user selected to a load images from an input device, such as a scanner, then the controller continues at step 1007, else the controller continues at step 1008. In step 1007, the controller inputs an image and provides it to the art server for storage in the image database. The user may also enter information describing the image. In step 1008, if the user selected to submit a query, then the controller continues at step 1009, else the controller loops to step 1001 to wait for user input. In step 1009, the controller invokes a function to submit a query.

Figure 11:
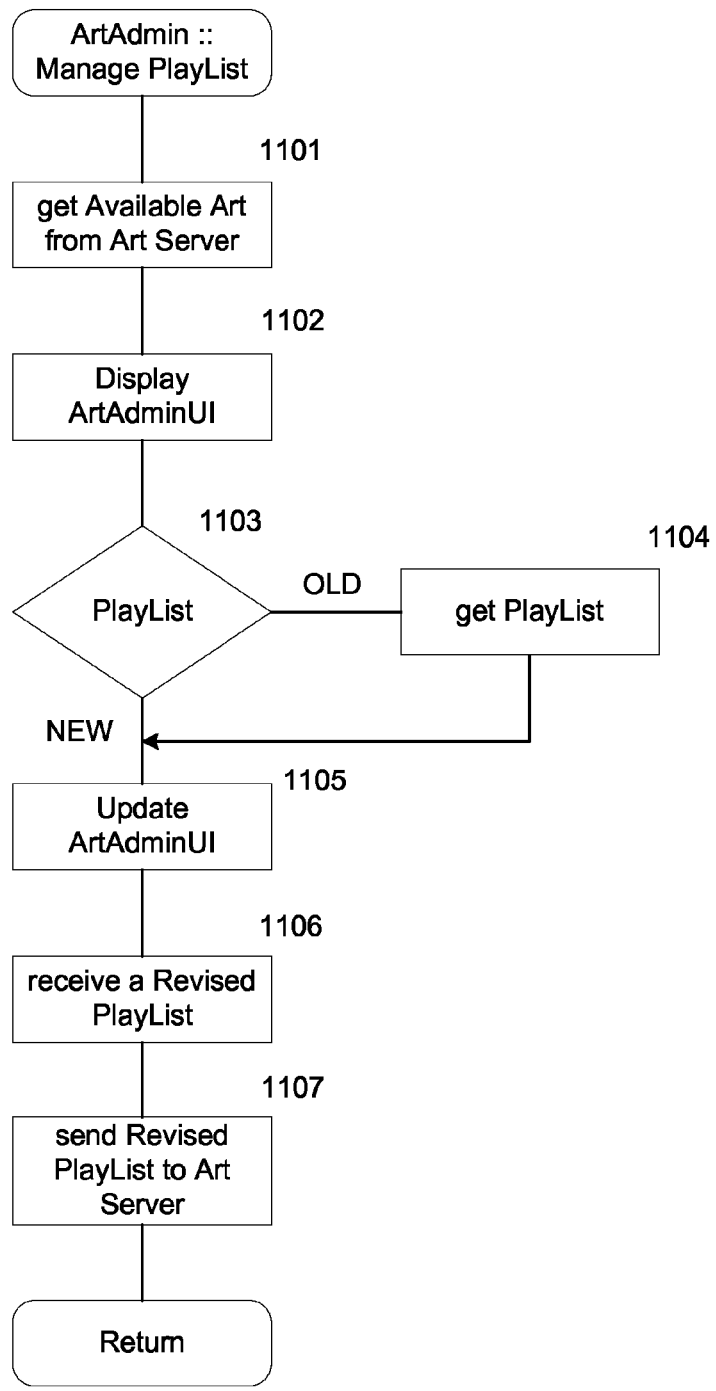
FIG. 11 is a flow diagram of the manage play list function of the art administration application.

FIG. 11 is a flow diagram of the manage play list function of the art administration application. This function displays the user interface corresponding to FIG. 3. In step 1101, the function retrieves information for the available art from the art server. In step 1102, the function displays the art management user interface. In step 1103, if the user selects to modify an existing play list, then the function continues at step 1104, else the function continues at step 1105. In step 1104, the function retrieves the old play list from the art server. In step 1105, the function updates the art management user interface to reflect the old play list. In step 1106, the function receives revisions to the play list from the user. In step 1107, the function sends the revised play list to the art server and returns.

Figure 12:
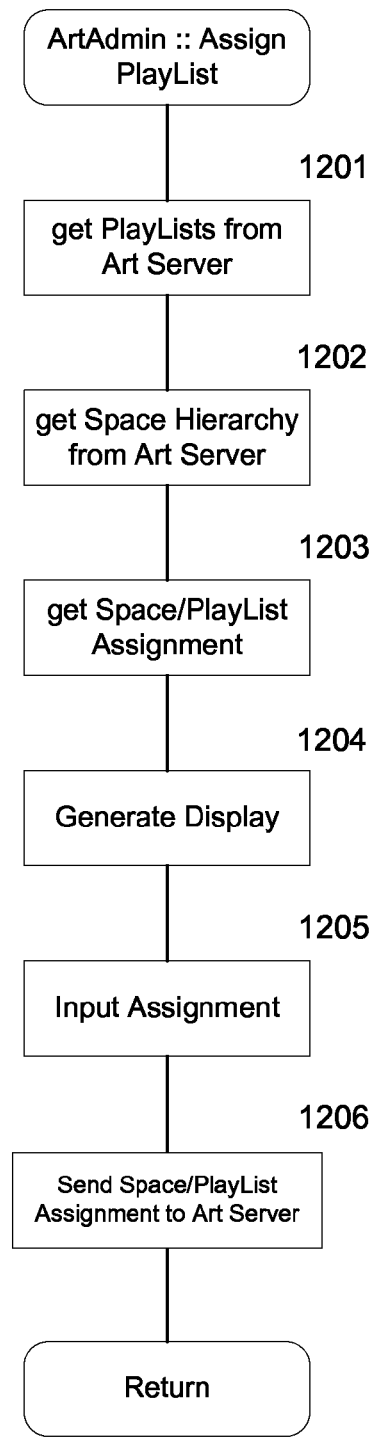
FIG. 12 is a flow diagram of the assign play list to space function.

FIG. 12 is a flow diagram of the assign play list to space function. The function displays the user interface corresponding to FIG. 4. In step 1201, the function retrieves the currently defined play lists from the art server. In step 1202, the function retrieves the space hierarchy from the art server. In step to 1203, the function retrieves the space/play list assignments from the art server. In step 1204, the function generates the display based on the retrieve data. In step 1205, the function receives user input of the assignment of a play list to a space. In step 1206, the function sends the space/play list assignment to the art server and then returns.

Figure 13:
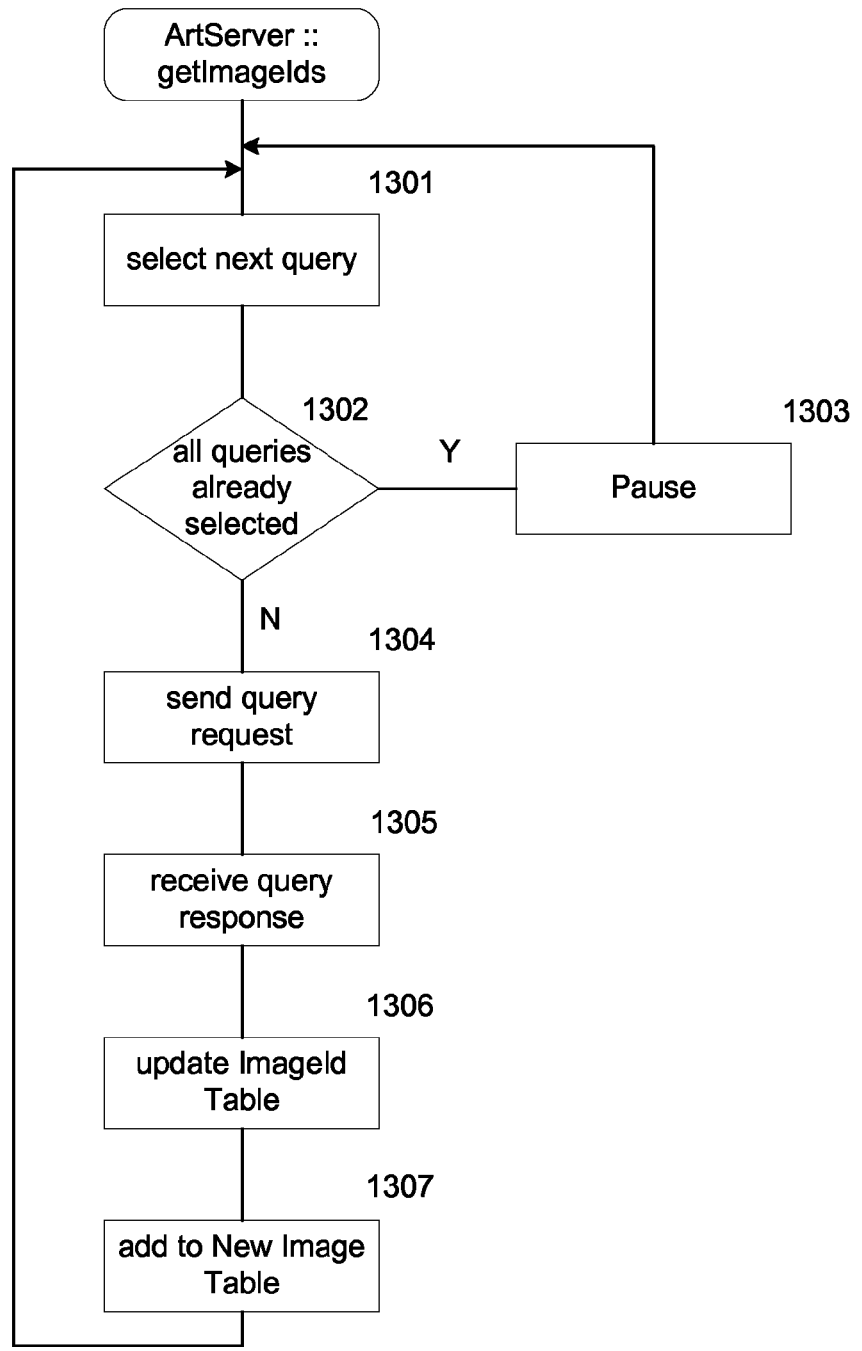
FIG. 13 is a flow diagram of the retrieve image identifier function of the art server.

FIG. 13 is a flow diagram of the retrieve image identifier function of the art server. This function is a part of the art mass storage interface. This function determines whether images that satisfy the queries are now accessible. In step 1301, the function selects the next query. In step 1302, if all the queries have already been selected, then the function continues at step 1303, else the function continues at step 1304. In step 1303, the function goes to sleep until the specified interval at which it is to next check for accessible images. The function then loops to step 1301 to process the queries. In step 1304, the function sends the query request to the mass storage device. In step 1305, the function receives the response to the query request. The sending and receiving of query requests and responses may be over the Internet and may use the hypertext transfer protocol ("HTTP"). In step 1306, the function updates the image identifier table with image information for images that are not already stored in the image identifier table. In step 1307, the function adds an entry to the new image table so that the image can be downloaded. The function then loops to step 1301 to select next query.

Figure 14:
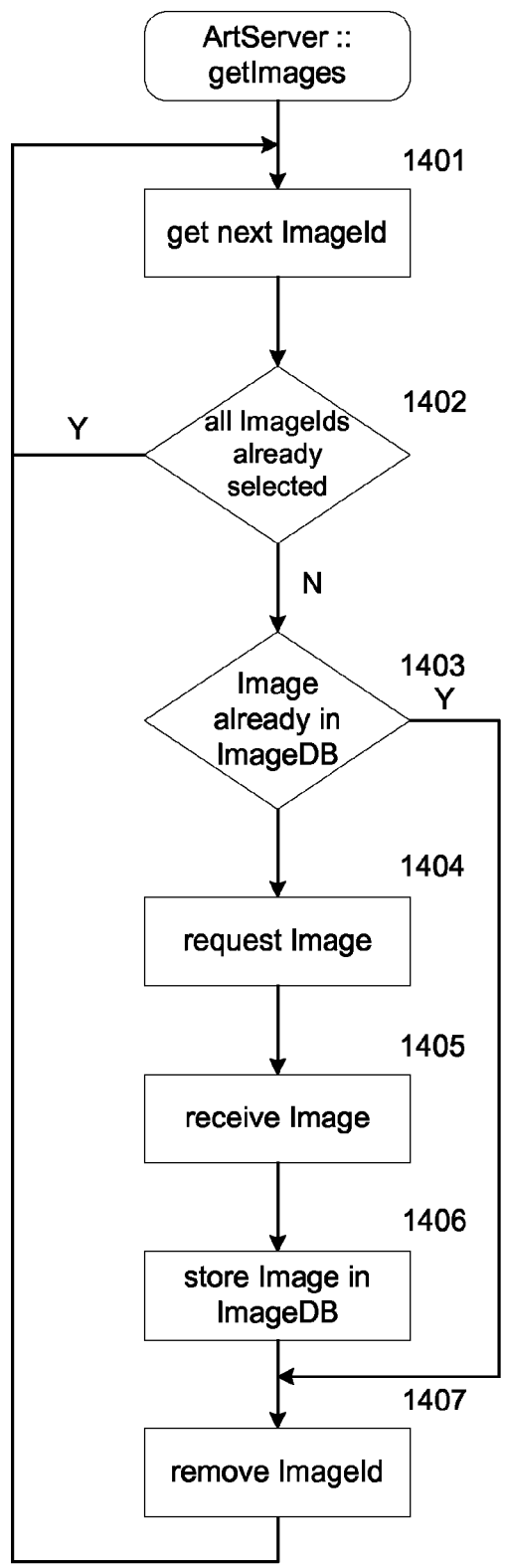
FIG. 14 is a flow diagram of the get images function of the art server.

FIG. 14 is a flow diagram of the get images function of the art server. The get images function is part of the art mass storage interface. This function processes the image identifiers that have been stored in the new image table and retrieves the corresponding image. In step 1401, the function retrieves the next image identifier, if any, from the new image table. In step 1402, if all the image identifiers have already been selected, then the function loops to step 1401, else the function continues at step 1403. In step 1403, if the image for the selected image identifier is already in the image database, then the function continues at step 1407, else the function continues at step 1404. In step 1404, the function requests the image from the mass storage device. In step 1405, the function receives the image. In step 1406, the function stores the image in the image database. In step 1407, the function removes the selected image identifier from the new image table and loops to step 1401 to select the next image.

Figure 15:
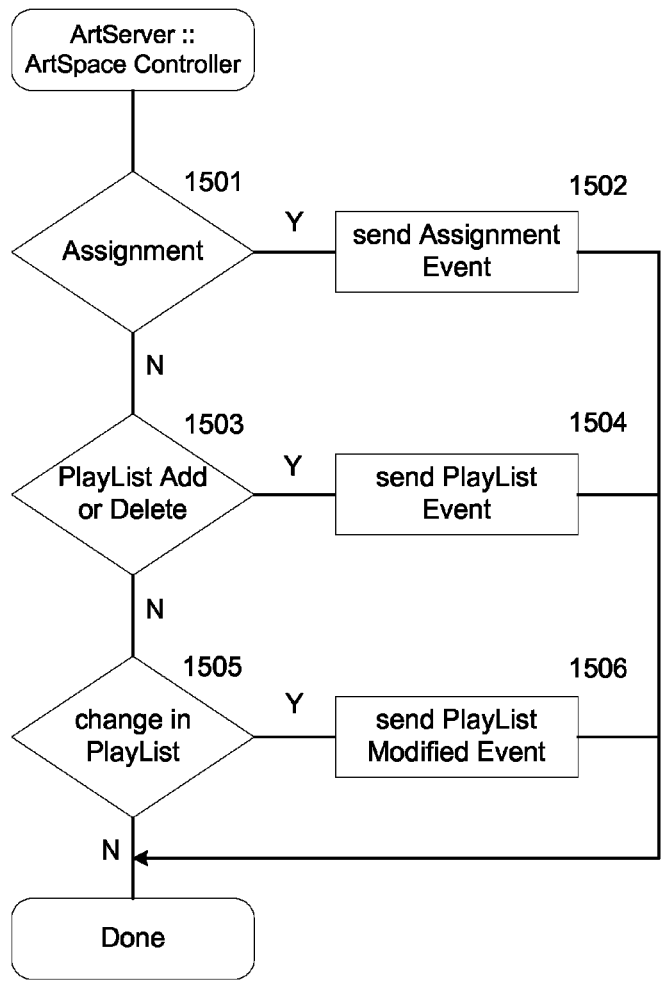
FIG. 15 is a flow diagram of the art space controller interface function.

FIG. 15 is a flow diagram of the art space controller interface function. This function identifies various conditions and sends event notifications to the art space controllers. In particular, the function identifies when a user has assigned a new play list to a space, identifies when a play list has been added or deleted, and identifies when a play list has been changed. In step 1501, if a new assignment has been made to a space, then the function sends an assignment event in step 1502, else the function continues at step 1503. In step 1503, if a play list has been added or deleted, then the function sends a play list modified event in step 1504, else the function continues at step 1505. In step 1505, if the play list has been changed, then the function sends a play list change event in step 1506, else the function completes.

Figure 16:
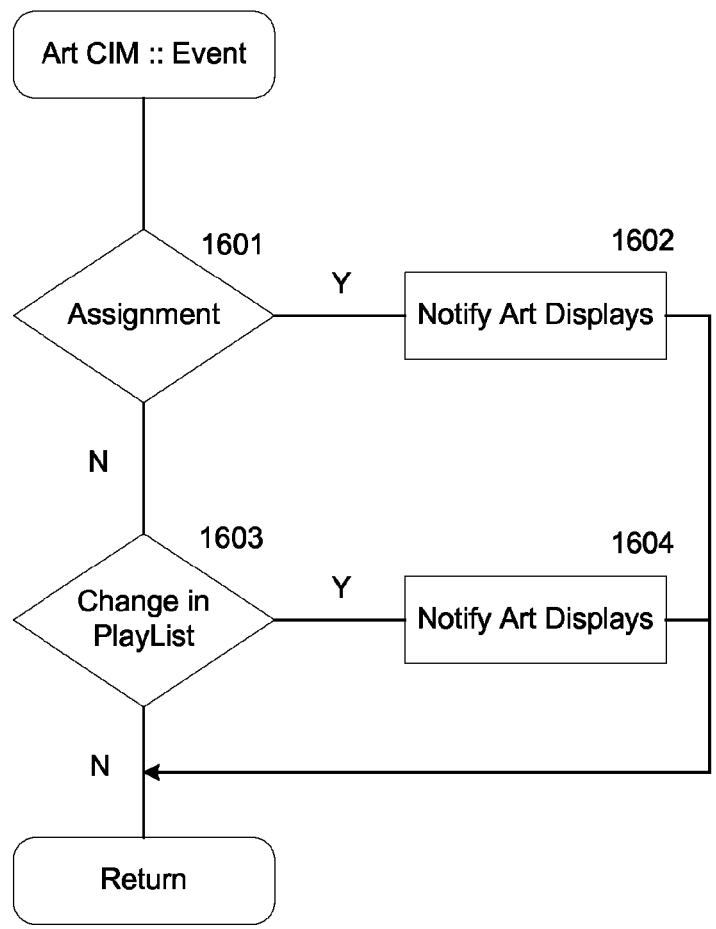
FIG. 16 is a flow diagram of the processing of receiving events at an art component interface module.

FIG. 16 is a flow diagram of the processing of receiving events at an art component interface module. In step 1601, if an assignment event is received, then the function notifies the art display modules in step 1602, else the function continues at step 1603. In step 1603, if a change play list event is received, then the function notifies the art display modules in step 1604, else the function returns.

Figure 17:
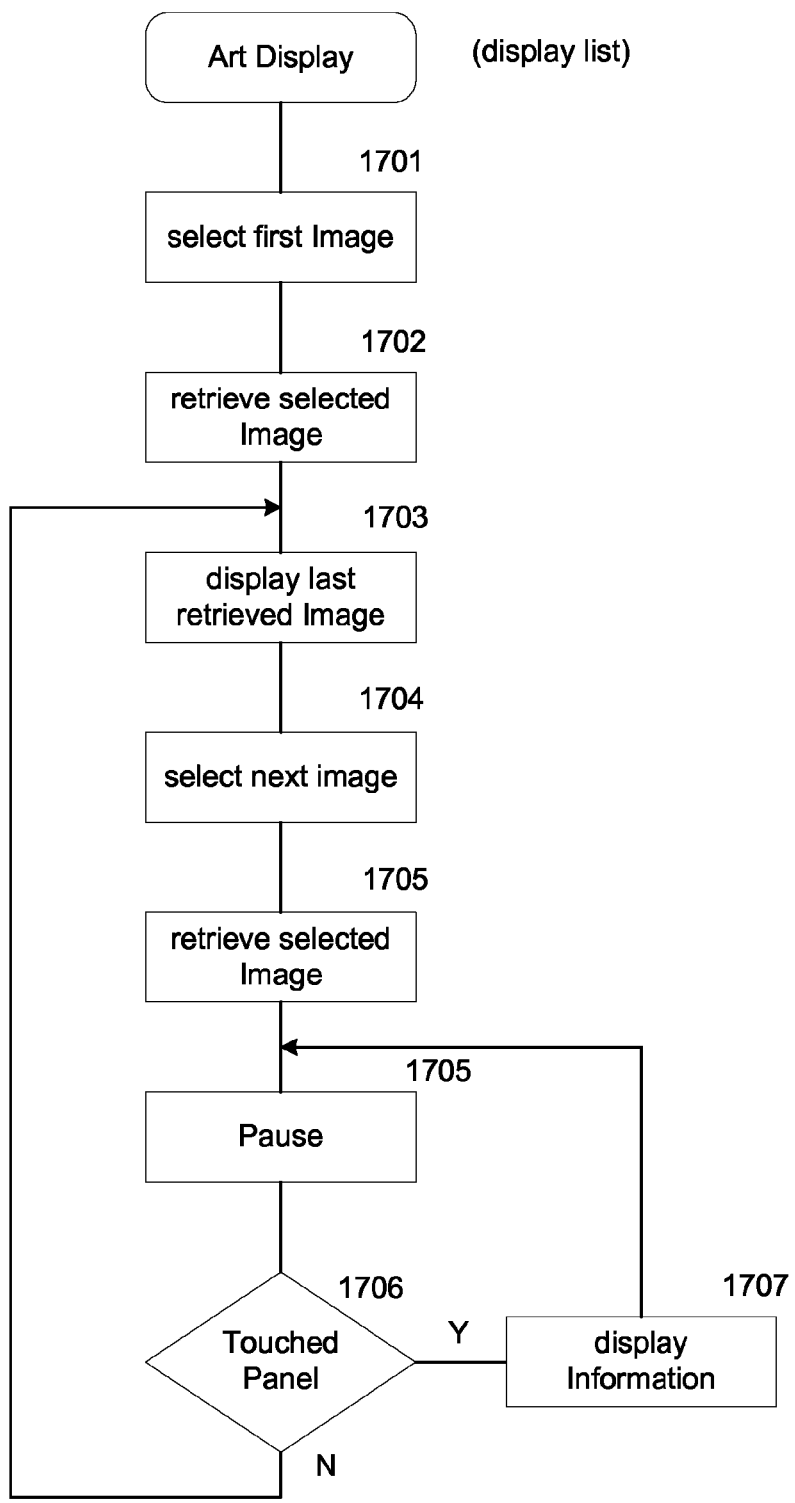
FIG. 17 is a flow diagram of the processing of an art display module.

FIG. 17 is a flow diagram of the processing of an art display module. The art display module overlaps the displaying of an image with retrieving from the art server of the next image to be displayed. The module continually displays the images in the play list by displaying the first image in the play list after the last image is displayed. The art display module is provided with a display list. In step 1701, the module selects the first image in the display list. In step 1702, the module retrieves the selected image from the art server. In steps 1703-1707, the module loops displaying the images in the play list at the specified intervals. In step 1703, the module displays the last retrieved image. In step 1704, the module selects the next image in the display list. In step 1705, the module retrieves the selected image from the art server. In step 1705, the modules pauses for the requisite interval or until a user touches the panel. In step 1706, if the user touches the panel, then the module continues at step 1707, else the module loops to step 1703 to select and display the last retrieve image. In step 1707, the function displays the information relating to the current image and then loops to step 1705 to pause. The display of the information corresponds to FIG. 1. In one embodiment, the module may cache the images so that each image of a play list only needs to be retrieved once.

Figure 18:
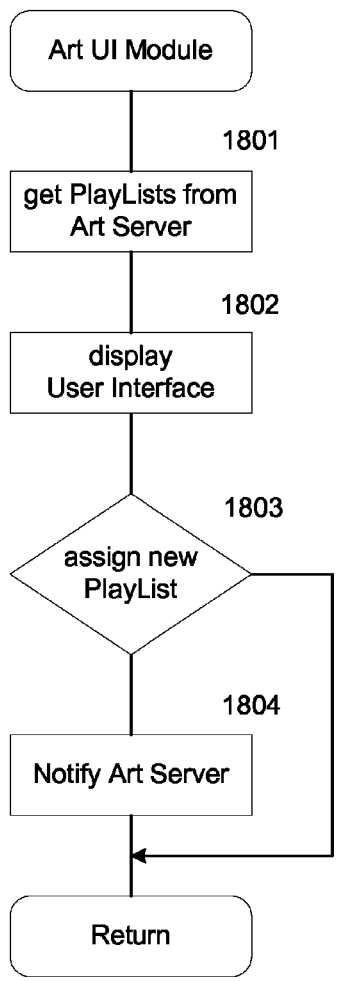
FIG. 18 is a flow diagram of the art user interface module.

FIG. 18 is a flow diagram of the art user interface module. This module controls the user interface of FIG. 2. In step 1801, the module retrieves the assigned play lists from the art server. In step 1802, the module displays the user interface for the user control point device. In step 1803, if the user indicated to assign a new play list the space, then the module continues at step 1804, else the module returns. In step 1804, the module notifies the art server to change the play list assignment for the space. The art server then sends out an event to notify the art space controllers that the play list has changed.

Although specific embodiments of, and examples for, the describe technology are presented for illustrative purposes, is not intended that the invention be limited to these embodiments. Equivalent methods, structures, processes, steps, and other modifications within the spirit of the invention are within the scope of the invention. For example, one skilled in the art will appreciate that the mass storage device may be a single storage device or multiple storage devices the may be provided by different vendors of images. Also, an image storage device may be provided with queries that then asynchronously notifies the art distribution system when images that satisfy the query become accessible. In this way, the art distribution system conceptually has "agents" working on its behalf. In one embodiment, the image storage device may be local to the art distribution system or some images may be stored in a local image storage device and others may be stored in a remote image storage device. The images may also be stored in formats other then a bitmap format. For example, the images may be stored using vector graphics. In one embodiment, the spatial hierarchy may not be related to the hierarchical arrangement of physical spaces in the environment. For example, the spatial hierarchy may group all bedrooms together even though the bedrooms may not be adjacent spaces. The art distribution system may also allow for multiple hierarchies to be defined to represent the spaces in the environment. A user can select the hierarchy of interest when assigning play lists. An art distribution system may be implemented using the techniques and facilities described in U.S. Patent Applications entitled "Method and System for Tracking Software Components." Accordingly, the invention is not limited to the specific embodiments, but instead the scope invention is specified by the following claims.

What is claimed:

1. A display distribution system, comprising:
    a server computer storing a plurality of images and in network communication with a display device capable of displaying images; and
    a client computer in network communication with the server computer; the client computer providing a capability of allowing a user to select at least one image from the plurality of images; and the client computer capable of instructing the server computer to transmit the selected at least one image for display on the display device, said display device being in a space separated from the client computer, the client computer providing an indication of the selected at least one of the plurality of images to the server computer and the server computer transferring the at least one of the plurality of images to the display device.

2. The system as recited in claim 1 wherein the client computer comprises a capability of instructing the server computer to transfer a selected subset of the plurality of images to the client computer for display.

3. The system as recited in claim 2 wherein the subset of the plurality of images is associated with a play list, the play list being a subset of images selected from the plurality of images by the user.

4. The system as recited in claim 3 wherein the play list comprises a time associated with the display of an image.

5. The system as recited in claim 4 wherein the time is user specified.

6. The system as recited in claim 1 wherein the server computer is in network communication with a second display device and wherein the client computer instructs the server to transmit the at least one image to the second display device.

7. The system as recited in claim 1 wherein the server computer stores information associated with the at least one image and wherein the information associated with the at least one image is transmitted to the display device in association with the at least one image.

8. The system as recited in claim 7 wherein the information is capable of being displayed by the display device.

9. A method of displaying images over a network, comprising:
   receiving over a network a plurality of images for storage on a server computer;
   receiving from a client computer in network communication with the server computer a user specified selection of at least one image from the plurality of images; and
   transmitting the at least one image over the network for display on a plurality of display devices, at least one of said display devices being in a space separated from the server computer and the client computer.

10. The method as recited in claim 9 comprising instructing the server computer to transfer a subset of the plurality of images to the client computer for display.

11. The method as recited in claim 9 comprising associating the subset of the plurality of images with a play list.

12. The method as recited in claim 11 comprising specifying a time associated with the display of an image.

13. A computer-readable storage medium bearing computer-readable instructions for carrying out a method of displaying images over a network, comprising:
   classifying a plurality of images stored on a server computer into at least one play list, the play list being a user specified subset of the plurality of images;
   receiving from a client computer in network communication with the server computer a selection of the at least one play list;
   receiving from the client computer instructions to display the plurality of images on a display associated with a space; and
   transmitting the at least one image over a network for display on a display device, said display device being in a space separated from the server computer and the client computer.

14. The computer-readable medium as recited in claim 13 comprising instructing the server computer to transfer a subset of the plurality of images to the client computer for display.

15. The computer-readable medium as recited in claim 13 comprising associating the subset of the plurality of images with a play list.

16. The computer-readable medium as recited in claim 15 comprising specifying a time associated with the display of an image.

17. The computer-readable medium as recited in claim 13 wherein the server computer is in network communication with a second display device and receiving from the client computer instructions to transmit the at least one image to the second display device.

18. The computer-readable medium as recited in claim 13 comprising selecting at least one of the plurality of images for inclusion in the at least one play list.

19. The computer-readable medium as recited in claim 13 wherein images are selected for inclusion in the play list based on at least on user defined criterion.

\* \* \* \* \*